United States Patent
McCullough et al.

(10) Patent No.: US 7,185,322 B2
(45) Date of Patent: Feb. 27, 2007

(54) METHOD AND APPARATUS FOR PARALLEL ACTION PROCESSING

(75) Inventors: Peter G. McCullough, Southborough, MA (US); Frederick H. Buckley, Hudson, MA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 10/889,232

(22) Filed: Jul. 12, 2004

(65) Prior Publication Data

US 2005/0144596 A1   Jun. 30, 2005

Related U.S. Application Data

(60) Provisional application No. 60/487,039, filed on Jul. 11, 2003.

(51) Int. Cl.
*G06F 9/46* (2006.01)
(52) U.S. Cl. ............................ 717/136; 718/100
(58) Field of Classification Search ......... 717/100–178
See application file for complete search history.

(56) References Cited

U.S. PATENT DOCUMENTS

| | | | | |
|---|---|---|---|---|
| 5,410,696 A | * | 4/1995 | Seki et al. ................ | 717/149 |
| 5,452,461 A | * | 9/1995 | Umekita et al. ........... | 717/149 |
| 5,479,598 A | * | 12/1995 | Feitelson et al. .......... | 715/772 |
| 5,561,801 A | * | 10/1996 | Simons et al. ............. | 717/149 |
| 5,732,234 A | * | 3/1998 | Vassiliadis et al. ........ | 712/200 |
| 5,768,594 A | * | 6/1998 | Blelloch et al. ........... | 717/149 |
| 5,774,728 A | * | 6/1998 | Breslau et al. ............. | 717/141 |
| 5,999,729 A | * | 12/1999 | Tabloski et al. ........... | 717/105 |
| 5,999,987 A | * | 12/1999 | O'Farrell et al. .......... | 719/330 |
| 6,433,802 B1 | * | 8/2002 | Ladd ......................... | 715/853 |
| 2003/0200536 A1 | * | 10/2003 | Stuefe ....................... | 717/140 |
| 2005/0066321 A1 | * | 3/2005 | Nikitin et al. ............. | 717/149 |

OTHER PUBLICATIONS

Notification of Transmittal of The International Search Report for Application PCT/US04/22175 (4 pages), Sep. 23, 2005.
Written Opinion of the International Searching Authority for Application PCT/US04/22175 (5 pages), Sep. 23, 2005.

* cited by examiner

*Primary Examiner*—Lewis A. Bullock, Jr.
(74) *Attorney, Agent, or Firm*—Baker Botts L.L.P.

(57) ABSTRACT

Methods, systems, apparatus and computer-readable media are disclosed for translating human-readable software elements into a machine executable format. According to a first aspect, a method is disclosed for translating human-readable software elements into a machine executable format. The method includes defining a plurality of actions to be performed. Each action is associated with at least one human-readable software element, and each action having an associated element type selected from among a plurality of element types. The method also includes sequencing the plurality of actions according to the plurality of associated element types. The method further includes executing a plurality of asynchronous action processing tasks, and assigning an action to each of the asynchronous action processing tasks in accordance with the sequencing until each of the actions is performed. Other methods, apparatus, systems and computer readable media are disclosed for translating human-readable software elements into a machine executable format.

22 Claims, 3 Drawing Sheets

METHOD AND APPARATUS FOR PARALLEL ACTION PROCESSING

CROSS REFERENCE TO RELATED APPLICATIONS

This application claims priority to and incorporates by reference the entirety of U.S. provisional application entitled "Method and Apparatus for Parallel Action Processing," Ser. No. 60/487,039, filed Jul. 11, 2003.

TECHNICAL FIELD

The present application generally relates to systems and methods for software development and execution. The present application relates more specifically to methods for asynchronously converting human-readable software components into an executable format.

BACKGROUND

In the course of software development, hundreds or even thousands of software components may be created for a single software application or system. These components, each consisting of the properly formatted syntax of a computer programming language, must be transformed from their human-readable source code format to an executable format. In the example of a software application written in a compiled language such as C++, for example, this transformation process includes compiling multiple source-code program modules into corresponding pieces of machine readable object code, linking these pieces of object code into a single executable file, and loading this executable into a host machine's execution space as will be clear to those of ordinary skill in the art. In a large software system, more than one such executable file, each a component of the overall system, may be employed. The process of transforming a collection of one or more software components from their human-readable format to an executable format is referred to herein as code promotion.

Code promotion may be automated through the execution of software designed to carryout the transformation process. For instance, a batch program may be designed to promote code in a serial manner (also referred to herein as "synchronous" or "linear"). Following a serial method, one component is completely processed before the next is begun. Such serial code promotion is employed by prior art source and configuration management products, and products which maintain audit trails for program source changes. One shortcoming of serial code promotion techniques is that they fail to efficiently utilize processor time during execution. Accordingly, executing code promotion in a serial fashion can be time intensive. Consequently, there is a need for methods and apparatus that perform code promotion in a more time efficient manner.

SUMMARY

The following presents a simplified summary of methods, apparatus, systems, and computer readable media associated with graphically presenting change and configuration management information in accordance with the present application. This summary is not an extensive overview and is not intended to identify key or critical elements of the methods, apparatus, systems, and/or media or to delineate the scope of the methods, apparatus, systems, and media. It conceptually identifies the methods, apparatus, systems, and media in a simplified form as a prelude to the more detailed description that is presented later.

In accordance with one aspect of the present application, an example method is disclosed for translating a plurality of human-readable software elements into a machine executable format. The method includes defining a plurality of actions to be performed. Each action is associated with at least one human-readable software element, and each action has an associated element type which is selected from among a plurality of element types. The method also includes sequencing the plurality of actions according to the plurality of associated element types. The method further includes executing a plurality of asynchronous action processing tasks, and assigning an action to each of the asynchronous action processing tasks in accordance with the sequencing. Actions continue to be assigned until each of the actions is performed.

In accordance with a second aspect of the present application, an example system is disclosed for translating human-readable software elements into a machine executable format. The system includes an action definition module operative to define a plurality of actions to be performed on a plurality of human-readable software elements. The action definition module is further operative to associate one of a plurality of element types with each action. The system also includes an action sequencing module which is operative to sequence actions defined by the action definition module according to element type.

The system further includes an asynchronous action execution module operative to instantiate a plurality of asynchronous action processing tasks. The asynchronous action execution module is further operative to assign each sequenced action to an asynchronous action processing task until all of the sequenced actions have been executed. The plurality of asynchronous action processing tasks are operative to execute the action assigned by the asynchronous action execution module.

In accordance with a third aspect of the present application, an example apparatus is disclosed for translating a plurality of human-readable software elements into a machine executable format. The apparatus includes a processor and a memory connected to the processor. The memory stores a program to control the operation of said processor. The processor is operative with the program in the memory to define a plurality of actions to be performed. Each action associated with at least one human-readable software element, and each action has an associated element type selected from among a plurality of element types.

The processor is also operative with the program in the memory to sequence the plurality of actions according to the plurality of associated element types, and execute a plurality of asynchronous action processing tasks. The program is further operative with the program in the memory to assign an action to each of the asynchronous action processing tasks in accordance with the sequencing until each of the actions is performed.

In accordance with a fourth aspect of the present application, an example computer-readable storage medium is disclosed. The medium is encoded with processing instructions for translating a plurality of human-readable software elements into a machine executable format.

Certain illustrative aspects of the methods, apparatus, systems and computer-readable media are described herein in connection with the following description and the annexed drawings. These aspects are indicative, however, of but a few of the various ways in which the principles of the methods, apparatus, systems, and media may be employed and thus the examples are intended to include such aspects and equivalents. Other advantages and novel features may become apparent from the following detailed description when considered in conjunction with the drawings.

BRIEF DESCRIPTION OF THE DRAWINGS

For a more complete understanding of the present methods and systems, reference is now made to the following description taken in conjunction with the accompanying drawings in which like reference numbers indicate like features and wherein.

DETAILED DESCRIPTION

Figure 1:
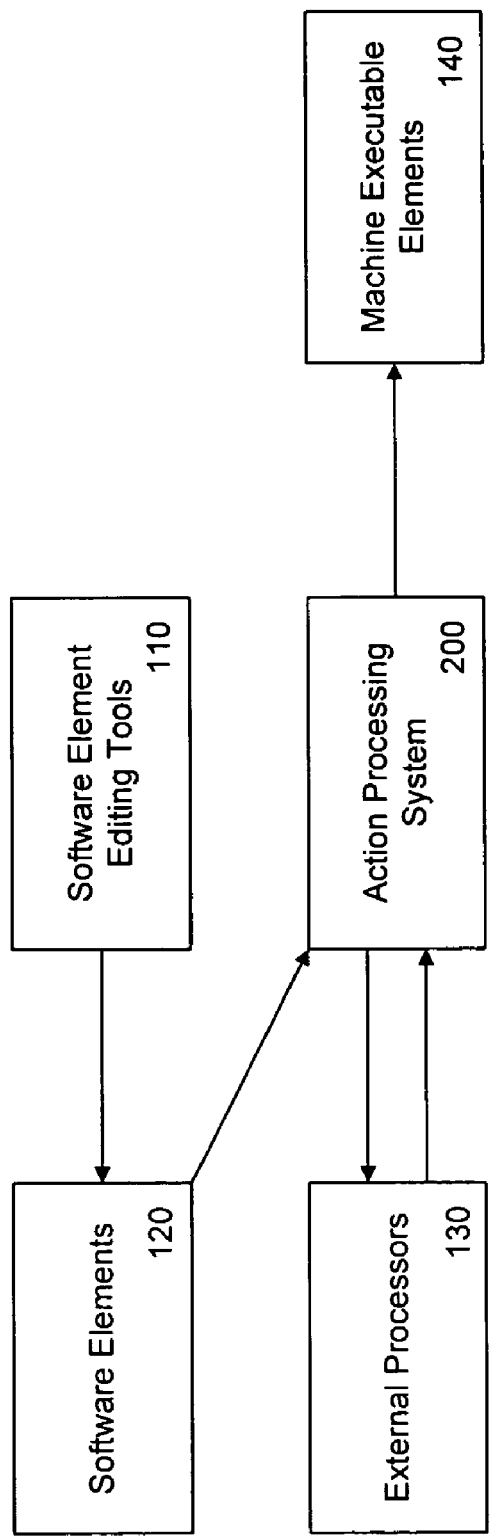
FIG. 1 is a block diagram illustrating an example software development environment.

Example methods and systems are now described with reference to the drawings, where like reference numerals are used to refer to like elements throughout. In the following description, for purposes of explanation, numerous specific details are set forth in order to facilitate thoroughly understanding the methods and systems. It may be evident, however, that the methods and systems can be practiced without these specific details. In other instances, well-known structures and devices are shown in block diagram form in order to simplify the description.

Referring to FIG. 1, there is illustrated an example software development environment 100 for producing machine executable programs and applications. Software development environment 100 includes one or more software element editing tools 110. Such tools 110 may include text editors, HTML editors, graphical editors, and database definition tools, for example. Software element editing tools 110 are used to create and edit a plurality of software elements 120. Software elements 120 include human-readable elements that may be transformed or interpreted to create a machine executable program or application.

Software development environment 100 further includes action processing system 200, also referred to herein as code promotion system 200, which processes software elements 110 in cooperation with external processors 130 to generate machine executable elements 140. External processors 130 may include any processor or utility for creating machine executable elements, such as an assembler, a compiler and a linker, for example.

Figure 2:
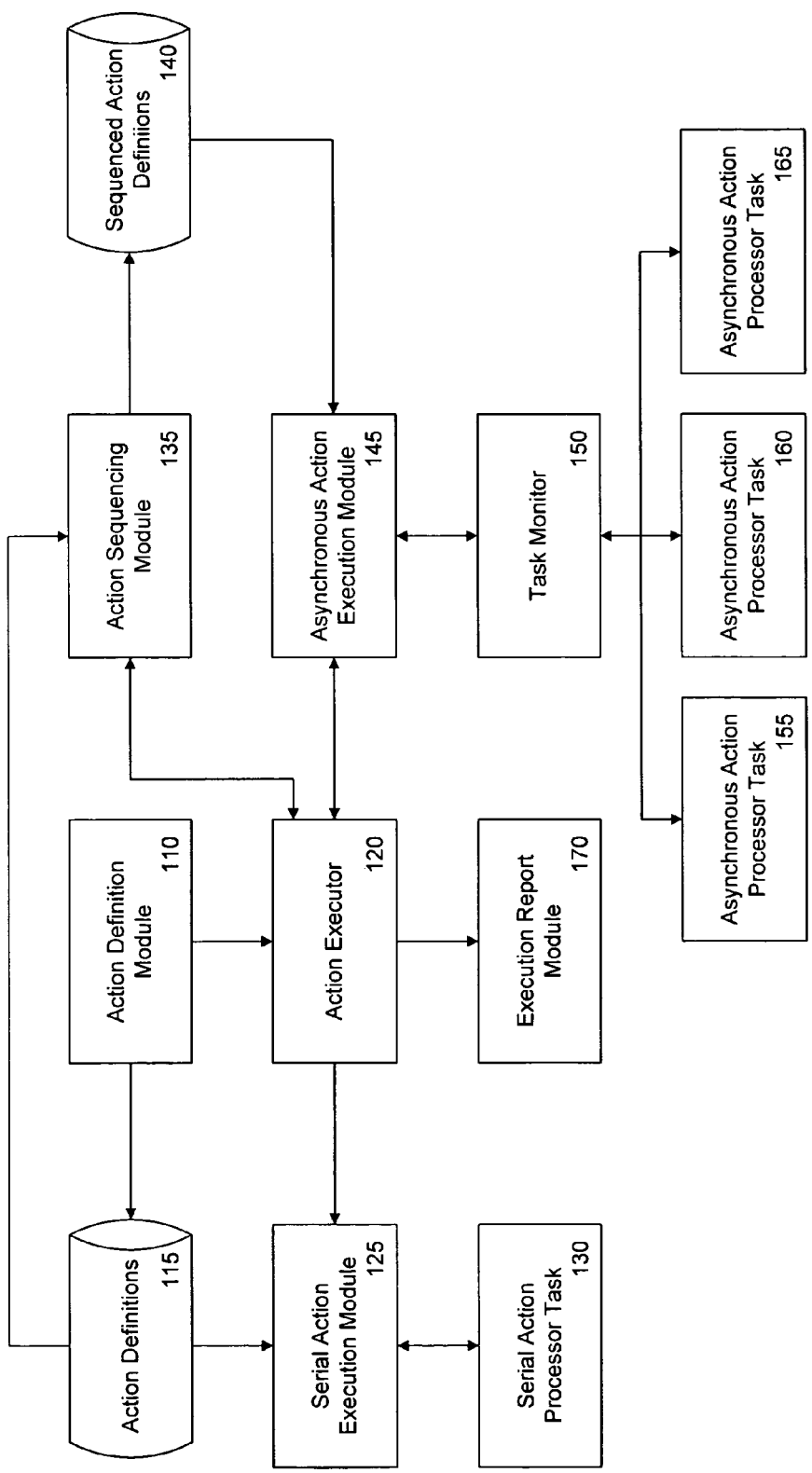
FIG. 2 is a block diagram illustrating an example code promotion system.

Referring to FIG. 2, a schematic block diagram illustrates example code promotion system 200, and associated data flow throughout the example system. The example code promotion system 200 may be a stand alone application or may be integrated into a more comprehensive software application and is used to transform human-readable software elements, such as C++ source code for example, into one or more machine executable files or modules. Example system 200 may be used to track changes for and transform software elements of a plurality of applications or projects in development.

Example system 200 includes an action definition module 210 that enables a user to define actions to be executed by the system to transform a set of human-readable software elements into an executable format. Action definition module 210 stores the action definitions in database 215. The action definitions in database 215 identify a human-readable software element, an element type, and an action to be executed. An element is an entity, such as a program copy member, for example, that is managed by system 200. An element type is a user-defined grouping of elements. Common element types include copy members, header files, programs and link-edit control statements, for example. Due to the dependencies that may exist between elements of different types, action processing may need to occur in a specific sequence. An example of this is a program that uses a copy member. The copy member might need to be processed prior to the program, because the program is dependent on the copy member.

When appropriate, such as upon completing a set of action definitions for a project, for example, a user may initiate action executor module 220 to execute the previously defined actions. Action executor module 220 initially determines whether the project actions are to be executed in a serial/synchronous fashion or in a parallel/asynchronous fashion. If the project actions are to be executed in a serial fashion, action executor module 220 directs serial action execution module 225 to control the execution of the project actions. Serial action execution module 225 employs a single serial action processor task 230 to execute each action defined for the project. In the illustrated embodiment, if project actions are determined to be executed in a serial fashion, the actions are executed in a first-in, first-out ("FIFO") order by serial action execution module 225. In the illustrated example, the project administrator could, at her option, enable or disable the parallel processing feature at installation or post-installation time.

If the project actions are to be executed asynchronously, action executor module 220 directs action sequencing module 235 to sequence the action definitions for the project according to element type. The sequenced action definitions are stored in database 240. Of course, other techniques may be used to provide sequenced action definitions, such as the use of an index file identifying the relevant action definitions and the order in which they should be processed asynchronously.

In the illustrated example, asynchronous action execution module 245 is then initiated by action executor 220. Asynchronous action execution module 245 accesses the sequenced action definitions 240 and directs task monitor 250 to instantiate and monitor a plurality of asynchronous action processor tasks 255, 260, and 265. Task monitor 250 assigns actions to tasks 250, 255, and 260 in the sequenced order. Task monitor 250 is notified by each task when it completes the execution of its assigned action. It should be recognized that although the example system includes three tasks 255, 260, and 265, more or fewer tasks may be employed. In one embodiment, a project administrator may define the number of asynchronous execution tasks that may be instantiated.

Upon being notified of a task completion, task monitor 250 queries the task for an action execution message log. The action execution messages are stored in memory by task monitor 250. Task monitor then receives the next sequenced action having the same element type, if any, from execution module 245. It should be noted that each task will be reused as many times as appropriate to complete processing of all actions in the sequenced action stack. If an action of the same element type is received, the action is dispatched to the available asynchronous action processor task 255, 260, and 165 that just completed its work. If an action is received, but for another element type, task monitor 250 waits for all asynchronous action processor tasks to complete processing the current element type prior to assigning actions having another element type. If the actions in the sequenced action database 240 have been exhausted, the execution module 245 notifies the action executor 220 of its completion. As execution processing completes, the action executor 220 queries the task monitor 250 for the stored action execution message logs and provides the messages to execution report module 270 which is responsible for preparing an execution report.

Figure 3:
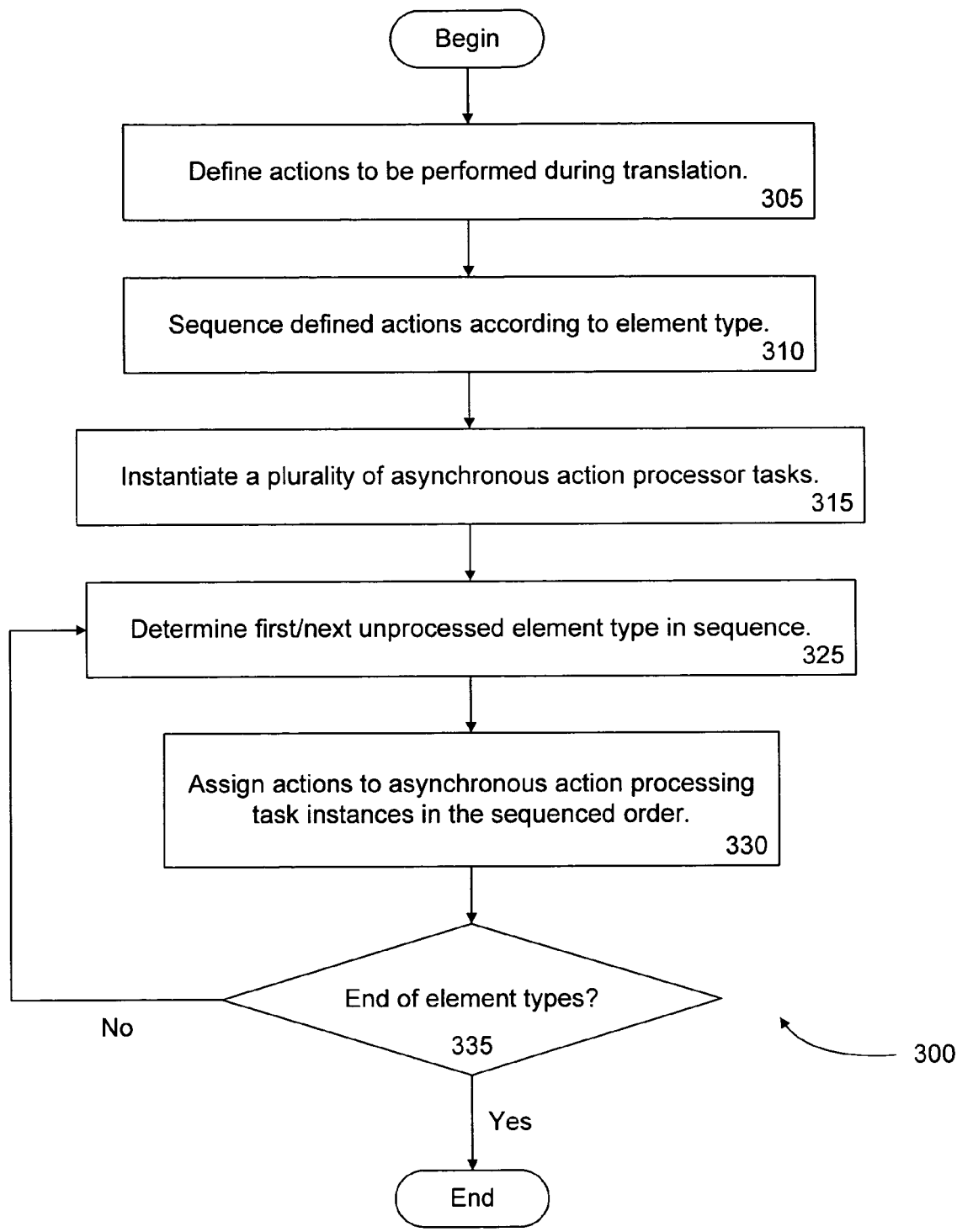
FIG. 3 is an example methodology for asynchronous code promotion.

FIG. 3 is a flowchart illustrating an example method 300 for translating human-readable software elements into machine executable format. At block 305, a user or automated process defines the actions to be performed during a translation. Each action definition references an associated software element, an associated element type selected from a set of predefined element types and an action to be taken.

In one embodiment, the defined actions are attributed to a particular project, and certain project-specific values may be assigned. For example, a user may define whether to utilize serial or parallel processing for a project. According to another example, a user may determine the number of parallel action processor tasks to utilize when processing the actions of a project.

At block 310, the defined actions are sequenced according to the element type associated with each action definition. At block 315, an asynchronous action execution module, such as module 245, instantiates a plurality of asynchronous action processor tasks, such as tasks 255, 260 and 265 the sequenced action definitions are processed in order according to element type as illustrated by blocks 325, 330 and 335. In one embodiment, all of the action definitions associated with a particular element type are processed to completion before processing action definitions of another element type. Upon processing all of the action definitions associated with all of the element types, the processing is completed.

As illustrated, the asynchronous action processing techniques described herein may make more efficient use of computer resources and lead to a reduction in the total time to complete processing as compared to the serial processing techniques of the prior art. The present application describes a system and method for accomplishing parallel action processing which has as one possible application the ability to promote code in a parallel manner enabling the realization of reduced processing time.

The methods and systems described in the present application may be embodied in a stand-alone code promotion utility or may be incorporated into a more comprehensive software system, such one that automates the management of the software development process, from initial design through distribution, for example. Such a software system may be used to maintain audit trails for program source changes, as well as follow customer-defined procedures to transform software elements source to an executable format, such as through compiling, assembling, and linking. Through the incorporation of one embodiment of the present application into such a software system, project administrators may use the system facilities to automate code promotion and may realized reduced processing time due to the parallel processing system and method described in the present application.

What has been described above includes several examples. It is, of course, not possible to describe every conceivable combination of components or methodologies for purposes of describing the systems, apparatus, methods, and computer readable media associated with asynchronously converting human-readable software components into an executable format. However, one of ordinary skill in the art may recognize that further combinations and permutations are possible. Accordingly, this application is intended to embrace such alterations, modifications, and variations that fall within the scope of the appended claims. Furthermore, to the extent that the term "includes" is employed in the detailed description or the claims, such term is intended to be inclusive in a manner similar to the term "comprising" as that term is interpreted when employed as a transitional word in a claim.

What is claimed is:

1. A method for translating a plurality of human-readable software elements into a machine executable format, comprising:
    defining a plurality of actions in order to translate human-readable software elements into a machine executable format, wherein a particular action is associated with at least one human-readable software element and with at least one of a plurality of element types;
    sequencing the plurality of actions according to the associated element types;
    executing a plurality of asynchronous action processing tasks; and
    assigning the plurality of actions to the asynchronous action processing tasks in accordance with the sequencing, wherein a particular asynchronous action processing task executes at least one of the plurality of actions.

2. The method of claim 1, further comprising determining whether an asynchronous processing indicator is set.

3. The method of claim 1, further comprising determining a maximum number of asynchronous action processing tasks.

4. The method of claim 1, wherein assigning the plurality of actions to the asynchronous action processing tasks comprises:
    selecting an element type in accordance with the sequencing;
    assigning each action associated with the selected element type to the asynchronous action processing tasks; and
    determining whether all actions associated with the selected element type have been processed.

5. The method of claim 4, wherein the steps of claim 4 are repeated for each element type.

6. The method of claim 1, wherein one of the plurality of element types represents a copy member.

7. The method of claim 1, wherein one of the plurality of element types represents a macro.

8. The method of claim 1, wherein one of the plurality of element types represents a C header.

9. The method of claim 1, wherein one of the plurality of element types represents a program.

10. The method of claim 1, wherein one of the plurality of element types represents a link.

11. A system for translating human-readable software elements into a machine executable format, comprising:
    an action definition module operative when executed by a processor to define a plurality of actions in order to translate human-readable software elements into a machine readable format, the action definition module further operative to associate one of a plurality of element types with at least one of the plurality of actions;
    an action sequencing module operative when executed by a processor to sequence the plurality of actions defined by the action definition module, the plurality of actions sequenced according to element type;

an asynchronous action execution module operative when executed by a processor to instantiate a plurality of asynchronous action processing tasks and further operative to assign at least one action to a particular asynchronous action processing task in accordance with the sequencing; and the particular asynchronous action processing task operative when executed by a processor to execute the at least one action assigned by the asynchronous action execution module.

12. An apparatus for translating a plurality of human-readable software elements into a machine executable format, comprising:

a processor operative to:

define a plurality of actions in order to translate human-readable software elements into a machine executable format, wherein a particular action is associated with at least one human-readable software element and with at least one of a plurality of element types;

sequence the plurality of actions according to the associated element types;

execute a plurality of asynchronous action processing tasks; and assign the plurality of actions to the asynchronous action processing tasks in accordance with the sequencing, wherein a particular asynchronous action processing task executes at least one of the plurality of actions.

13. The apparatus of claim 12, wherein the processor is further operative to determine whether an asynchronous processing indicator is set.

14. The apparatus of claim 12, wherein the processor is further operative to determine a maximum number of asynchronous action processing tasks.

15. The apparatus of claim 12, wherein the processor is further operative to:

select an element type in accordance with the sequencing;

assign each action associated with the selected element type to the plurality of asynchronous action processing tasks; and determine whether all actions associated with the selected element type have been processed.

16. The apparatus of claim 15, wherein the processor is further operative to execute the steps of claim 15 for each element type.

17. The apparatus of claim 12, wherein one of the plurality of element types represents a copy member.

18. The apparatus of claim 12, wherein one of the plurality of element types represents a macro.

19. The apparatus of claim 12, wherein one of the plurality of element types represents a C header.

20. The apparatus of claim 12, wherein one of the plurality of element types represents a program.

21. The apparatus of claim 12, wherein one of the plurality of element types represents a link.

22. A computer-readable storage medium encoded with processing instructions for translating a plurality of human-readable software elements into a machine executable format, the processing instructions operable when executed to direct a computer to perform the steps of:

defining a plurality of actions in order to translate human-readable software elements into a machine executable format, wherein a particular action is associated with at least one human-readable software element and with at least one of a plurality of element types;

sequencing the plurality of actions according to the associated element types;

executing a plurality of asynchronous action processing tasks; and assigning the plurality of actions to the asynchronous action processing tasks in accordance with the sequencing, wherein a particular asynchronous action processing task executes at least one of the plurality of actions.

* * * * *